(12) United States Patent
Kim et al.

(10) Patent No.: US 8,411,417 B2
(45) Date of Patent: Apr. 2, 2013

(54) SOLID ELECTROLYTIC CONDENSER WITH ENHANCED VOLUMETRIC EFFICIENCY

(75) Inventors: Jae Kwang Kim, Suwon-si (KR); Kwan Hyeong Kim, Suwon-si (KR); Jun Suk Jung, Suwon-si (KR); Jae Yik Howang, Suwon-si (KR); Chong Hoon Pak, Seoul (KR); Jae Jun Park, Hwaseong-si (KR)

(73) Assignee: Samsung Electro-Mechanics Co., Ltd. (JP)

( * ) Notice: Subject to any disclaimer, the term of this patent is extended or adjusted under 35 U.S.C. 154(b) by 376 days.

(21) Appl. No.: 12/761,434

(22) Filed: Apr. 16, 2010

(65) Prior Publication Data

US 2011/0038102 A1   Feb. 17, 2011

(30) Foreign Application Priority Data

Aug. 12, 2009 (KR) .................. 10-2009-0074300

(51) Int. Cl.
*H01G 4/228* (2006.01)
*H01G 9/00* (2006.01)

(52) U.S. Cl. .......................... 361/540; 361/523

(58) Field of Classification Search .................. 361/538, 361/540, 528, 532, 523, 541
See application file for complete search history.

(56) References Cited

U.S. PATENT DOCUMENTS

| | | | | |
|---|---|---|---|---|
| 5,390,074 A * | 2/1995 | Hasegawa et al. | | 361/540 |
| 5,638,253 A * | 6/1997 | Hasegawa | | 361/535 |
| 6,380,577 B1 * | 4/2002 | Cadwallader | | 257/298 |
| 6,807,045 B2 * | 10/2004 | Arai et al. | | 361/302 |
| 6,819,546 B2 * | 11/2004 | Kuriyama | | 361/535 |
| 6,870,728 B1 * | 3/2005 | Burket et al. | | 361/538 |
| 7,161,797 B2 * | 1/2007 | Vaisman et al. | | 361/540 |
| 7,821,795 B2 * | 10/2010 | Sugaya et al. | | 361/761 |
| 2008/0232039 A1 * | 9/2008 | Saito et al. | | 361/534 |
| 2008/0247122 A1 * | 10/2008 | Vaisman et al. | | 361/533 |
| 2009/0154065 A1 * | 6/2009 | Choi et al. | | 361/523 |

FOREIGN PATENT DOCUMENTS

| | | | |
|---|---|---|---|
| JP | 2000323357 A | | 11/2000 |
| JP | 2001274539 A | * | 10/2001 |
| JP | 200250544 A | | 2/2002 |
| JP | 2004119409 A | | 4/2004 |
| JP | 2006156903 A | * | 6/2006 |
| JP | 2006319113 A | * | 11/2006 |
| JP | 2007317813 A | * | 12/2007 |
| JP | 200828383 A | | 2/2008 |
| JP | 2008098394 A | | 4/2008 |
| JP | 2009004671 A | | 1/2009 |
| KR | 10-2002-0026673 A | | 4/2002 |
| KR | 1020050010633 B1 | | 1/2005 |

* cited by examiner

*Primary Examiner* — David M Sinclair
(74) *Attorney, Agent, or Firm* — Lowe Hauptman Ham & Berner, LLP

(57) ABSTRACT

A solid electrolytic condenser includes a condenser element, an anode wire including one end inserted into the condenser element, a cathode drawing layer formed on outer side of the condenser element, terminal reinforcements arranged respectively under opposite side portions of a bottom surface of the condenser element, a liquid epoxy resin filled in spaces between the terminal reinforcements and between the bottom surface of the condenser element and top surfaces of the terminal reinforcements, a molding part surrounding the condenser element while exposing the other end of the anode wire, an end portion of the cathode drawing layer, and bottom surfaces of the terminal reinforcements, and anode and cathode terminals formed by a plating layer provided on the bottom surfaces of the terminal reinforcements and on opposite side surfaces of the molding part. The liquid epoxy resin includes fillers of a smaller size than those in the molding part.

16 Claims, 6 Drawing Sheets

SOLID ELECTROLYTIC CONDENSER WITH ENHANCED VOLUMETRIC EFFICIENCY

CROSS-REFERENCE TO RELATED APPLICATIONS

This application claims the benefit of Korean Patent Application No. 10-2009-0074300 filed with the Korea Intellectual Property Office on Aug. 12, 2009, the disclosure of which is incorporated herein by reference.

BACKGROUND OF THE INVENTION

1. Field of the Invention

The present invention relates to a solid electrolytic condenser and method for manufacturing the same; and, more particularly, to a solid electrolytic condenser and method for manufacturing the same, in which a cathode drawing layer is formed on one side of a condenser element by a conductive paste, terminal reinforcements are adhered to bottom surfaces of the condenser element, so that it is possible to maximize volumetric efficiency of the condenser element, and ensure mechanical reliability of the product.

2. Description of the Related Art

In general, a solid electrolytic condenser is one of electronic components used for the purpose of breaking a direct current and allowing an alternating current to flow, in addition to the purpose of accumulating electricity. A tantalum condenser has been manufactured as a typical solid electrolytic condenser.

The tantalum condenser is used for industrial equipment and an application circuit which has low use range of a rated voltage. In particular, the tantalum condenser is mostly used for reducing noise of a portable communication device, or a circuit sensitive to frequency characteristics.

Such a solid electrolytic condenser is manufactured by inserting a lead wire into either a portion except for the center, or a center of a condenser element composed of tantalum, or by banding the inserted lead wire in outside of the condenser element.

Also, as a method for assembling a lead frame to the condenser element, there is used a method in which an anode terminal is drawn by spot-welding an anode lead wire and an anode lead frame, and an electrode terminal is drawn through an anode and cathode lead forming after performing mold package.

FIGS. 1 and 2 are views showing a conventional solid electrolytic condenser. FIG. 1 is a perspective view showing a conventional solid electrolytic condenser. FIG. 2 is a cross-sectional view showing a conventional solid electrolytic condenser.

As shown in drawings, the conventional solid electrolytic condenser 10 includes a condenser element 11 composed of a dielectric powder material which determines capacity and characteristics of the condenser, anode and cathode lead frames 13 and 14 connected to the condenser element 11 in such a manner to be easily mounted on a Printed Circuit Board (PCB), an epoxy case 15 which is molded with epoxy to protect the condenser element 11 from an external environment and makes a shape of the condenser element.

In this case, the condenser element 11 has a rod-shaped anode wire 12 formed on one side thereof to be protruded at a predetermined length.

The anode wire 12 has a pressurized air surface 12a which is provided with a flat external surface, so as to improve a rate at which it comes into contact with the anode lead frame 13 and to prevent right and left shaking at the time of welding.

Herein, a process for manufacturing the condenser element 11 includes a step of molding and sintering dielectric powder into a rectangular parallelepiped shape in a press process, a step of forming an oxidized film on an external surface thereof after undergoing a formation process, a step of impregnating the resulting oxidized film with manganese nitrate aqueous solution, and a step of performing thermal decomposition of manganese dioxide composed of solid electrolyte on the external surface thereof.

A process for connecting the anode lead frame 13 and the cathode lead frame 14 to the condenser element 11 manufactured in this manner includes a step of drawing an anode terminal by welding the plate-shaped anode lead frame 13 to the pressurized air surface 12a of the rod-shaped anode wire 12 protruded at a predetermined length on one side of the condenser element 11, and a step of drawing a cathode terminal via a conductive adhesive coated on either the external surface of the condenser element 11 or the cathode lead frame 14.

Then, the condenser element 11 electrically connected to each of the anode lead frame 13 and the cathode lead frame 14 is molded with an epoxy in an armoring process to form the epoxy case 15, and then a condenser is completely manufactured after finally performing a marking process.

In the conventional solid electrolytic condenser manufactured in this manner, as volumetric efficiency of the condenser element 11 becomes remarkably reduced from volume of entire solid electrolytic condenser including the epoxy case 15, capacitance is reduced, and impedance is increased.

Also, in the conventional solid electrolytic condenser, high temperature heat is generated during welding of the anode wire 12 and the anode lead frame 13, which results in the influence of the generate heat on the condenser element 11 through the anode wire 12. Therefore, the condenser element 11 vulnerable to heat is damaged.

As a result, the thermal impact applied to the condenser element 11 breaks dielectric, and thus characteristics of a product is deteriorated and a defective product is produced, resulting in a rise of the manufacturing costs.

SUMMARY OF THE INVENTION

The present invention has been proposed in order to overcome the above-described problems and it is, therefore, an object of the present invention to provide a solid electrolytic condenser and method for manufacturing the same, in which a cathode drawing layer is formed on one side of a condenser element by a conductive paste, terminal reinforcements are adhered to bottom surfaces of the condenser element, so that it is possible to maximally increase volumetric efficiency of the condenser element, and ensure mechanical reliability of the product.

Also, in a solid electrolytic condenser of the present invention, condenser elements are arranged to be parallel to one another on the top portion of terminal reinforcements, so that low ESR characteristics can be implemented. In addition, a surface area of the condenser element is enlarged per unit volume such that capacitance can be increased.

In accordance with one aspect of the present invention to achieve the object, there is provided a solid electrolytic condenser including: a condenser element whose inner has an anode polarity; an anode wire whose one end portion is inserted into the condenser element; a cathode drawing layer formed at one side of an external surface of the condenser element; terminal reinforcements coupled to the both-side portions of a bottom surface of the condenser element; a liquid epoxy resin (EMC) filled between the terminal reinforcements to seal the bottom surface of the condenser element; a molding part for surrounding an outer circumferential surface of the condenser element, the modeling part formed in such a manner that a protruded end portion of the anode wire, an end portion of the cathode drawing layer, and the bottom surface of the terminal reinforcement can be exposed; and anode and cathode terminals formed by a plating layer provided on the bottom surface of the terminal reinforcements and the both-side portion of the molding part.

The condenser element may be further formed to have a cathode layer on an external surface thereof. As a conductive buffering material is interposed between an external-side surface of the condenser element having the cathode layer formed thereon and the cathode drawing layer, the conductive buffering material plays a role of solving bonding trouble which may occur between the cathode drawing layer and an interface of the condenser element.

A liquid epoxy resin is coated on a bottom portion of the condenser element. The liquid epoxy resin is partially interposed between the bottom surface of the condenser element and the terminal reinforcements, and thus the liquid epoxy resin plays a role of firmly sticking the condenser element and the terminal reinforcements. Also, the liquid epoxy resin allows that condenser element and the terminal reinforcement of the cathode terminal side to be insulated from each other.

The terminal reinforcements are composed of a metal material or a synthetic resin material which are above predetermined strength. As for the metal material, steel, or Cu, and Ni are exemplified.

In this case, it is preferable that the terminal reinforcements are formed to be within a thickness of 100 μm. Further, it is preferable that the terminal reinforcements are formed to have a thickness of 20 to 50 μm in order to increase volumetric efficiency of the condenser element coupled to the top portion thereof.

It is preferable that the epoxy resin without a release agent is used as the liquid epoxy resin. The epoxy resin allows four surfaces except for an external exposure surface of the terminal reinforcements formed in a rectangular parallelepiped shape to be in contact with one another, thereby improving bonding strength.

Also, a molding part may be formed on an outer circumferential surface of the condenser element except for the bottom surface of the terminal reinforcements and the bottom surface of the condenser element.

In this case, the molding part may be formed on the outer circumferential surface of the condenser element in a state where an end portion of the cathode drawing layer and a protruded end portion of an anode wire coupled to the condenser element are exposed.

The condenser element has the cathode layer and the cathode reinforcement layer on the outer circumferential surface thereof. The cathode layer is composed of an insulating layer composed of an oxidized film of $Ta_2O_5$ on the surface of the condenser element, and of a solid electrolyte layer composed of $MnO_2$. In this case, carbon and silver (Ag) paste are sequentially coated on the outer circumferential surface thereof, thereby forming the cathode reinforcement layer.

In this case, the cathode drawing layer formed on one-side surface of the condenser element having the cathode layer formed thereon is formed in a dispensing type, a dipping type, or a printing type. The cathode drawing layer is formed in a viscous paste type in which a conductive material is contained.

Also, the anode terminal and the cathode terminal are formed on the both-side surfaces of the molding part and the bottom surface of the terminal reinforcements, by the plating layer, respectively.

The anode terminal and the cathode terminal are formed in any one of electro plating, electroless plating, dipping, and paste coating.

In this case, when the anode terminal and the cathode terminal are formed through electroless plating, preferably, the plating layer is composed of an internal plating layer formed through electroless Ni/P plating, and an external plating layer formed on the internal plating layer through Cu plating, or Sn plating.

Also, a plurality of condenser elements are arrange to be parallel to one another on the terminal reinforcements on which the liquid epoxy resin is coated. In this case, the condenser elements are arranged to be parallel in a vertical direction or a horizontal direction.

In accordance with still another aspect of the present invention to achieve the object, there is provided a method for manufacturing a solid electrolytic condenser including the steps of: forming terminal reinforcements on a sheet formed in a film type of a synthetic resin; coating a liquid epoxy resin on a top surface of the terminal reinforcements and a top surface of the sheet; preparing a condenser element whose inner has an anode polarity, the condenser having a cathode layer formed on a surface thereof and an anode wire coupled to an one-side end thereof; forming the cathode drawing layer on the other-side end of the condenser element; arraying the condenser element at every predetermined spacing on the sheet on which the liquid epoxy resin is coated; forming a molding part on the outer-side surface of the arrayed condenser element; cutting a molding product in such a manner that end portions of the cathode drawing layer and the anode wire are exposed to both-side portions of the molding part; and forming the anode terminal and the cathode terminal on the both-side surfaces of the molding product by a plating layer.

In this case, the method further includes a step of forming a conductive buffering material on an interface formed between a surface of the condenser element and the cathode drawing layer so as to reduce bonding trouble, before the step of forming the cathode drawing layer on the end surface of the other side of the condenser element.

The cathode drawing layer is formed in any one of a dispensing type, a dipping type, and a printing type, and is composed of a viscous paste containing a conductive material.

Also, the method further includes a step of removing the sheet from a bottom surface of the terminal reinforcements, after the step of cutting the both-side portions of the molding part.

Also, in the step of arraying the condenser element on the sheet, the both-side portions of the condenser element is supported by the terminal reinforcements formed on the sheet, and the condenser element is adhered to the terminal reinforcements by the liquid epoxy resin interposed between a top surface of the sheet and a top surface of the terminal reinforcements.

Also, in the step of forming the terminal reinforcements on the sheet, the terminal reinforcement is formed by either patterning through etching, or patterning through electro or electroless plating.

Also, the method further includes a step of performing grinding and trimming for a cutting surface in order to remove impurities of the cutting surface, after the step of cutting the molding product.

Also, in the step of forming the anode and cathode terminals on both-side surfaces of the molding part by the plating layer, the anode and cathode terminals are formed in electro plating, electroless plating, dipping, or pasting coating.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERABLE EMBODIMENTS

Figure 1:
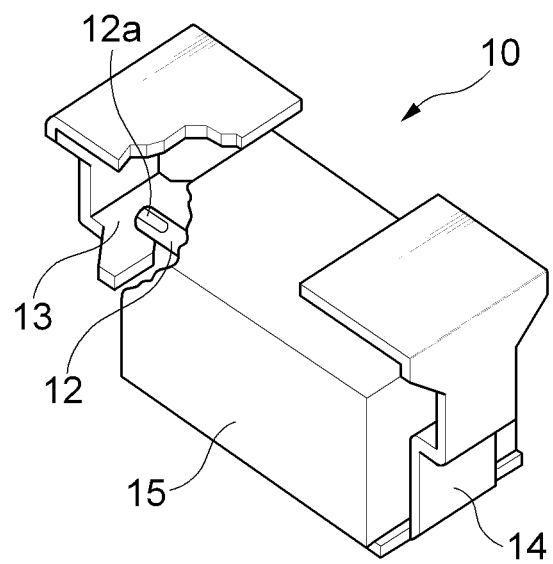
FIG. 1 is a perspective view showing a conventional solid electrolytic condenser.
Figure 2:
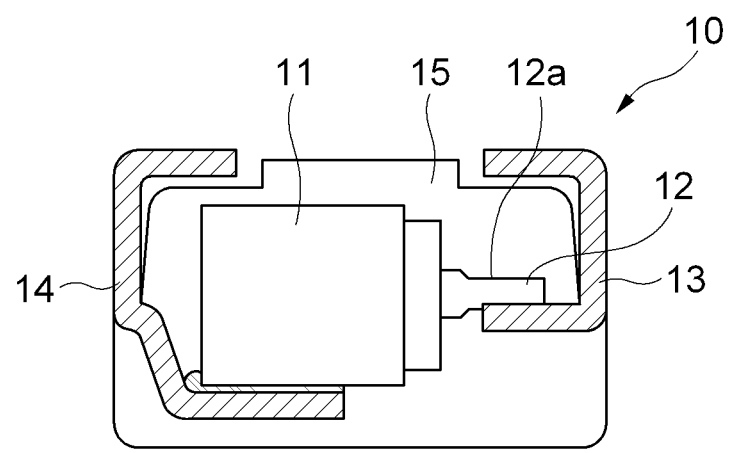
FIG. 2 is a cross-sectional view showing a conventional solid electrolytic condenser.

Embodiments of a solid electrolytic condenser and a method for manufacturing the same in accordance with the present invention will be described in detail with reference to the accompanying drawings. When describing them with reference to the drawings, the same or corresponding component is represented by the same reference numeral and repeated description thereof will be omitted.

Figure 3:
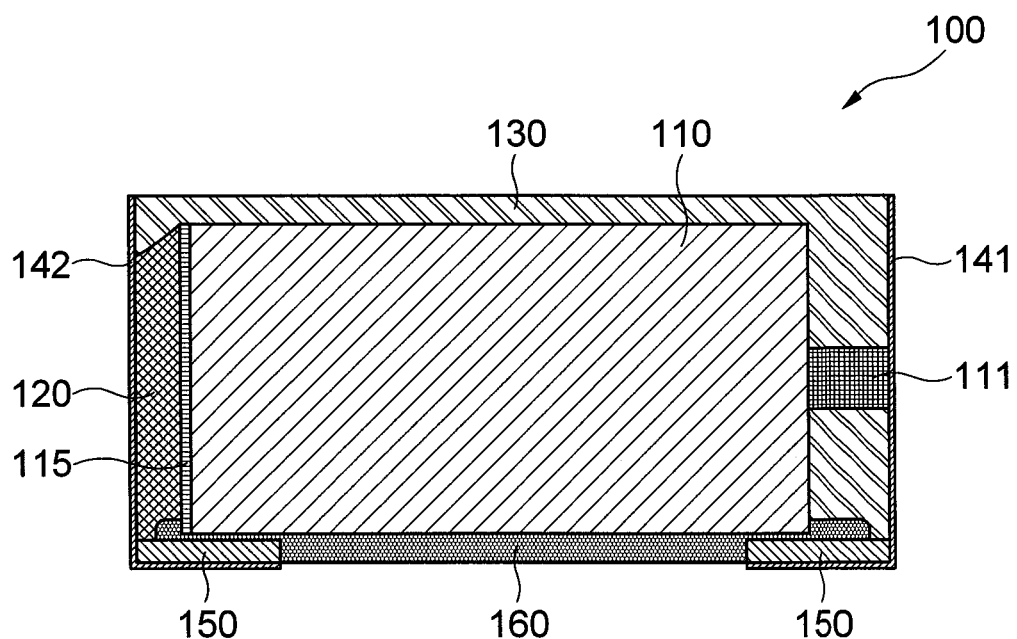
FIG. 3 is cross-sectional view showing a solid electrolytic condenser in accordance with an embodiment of the present invention.
Figure 4:
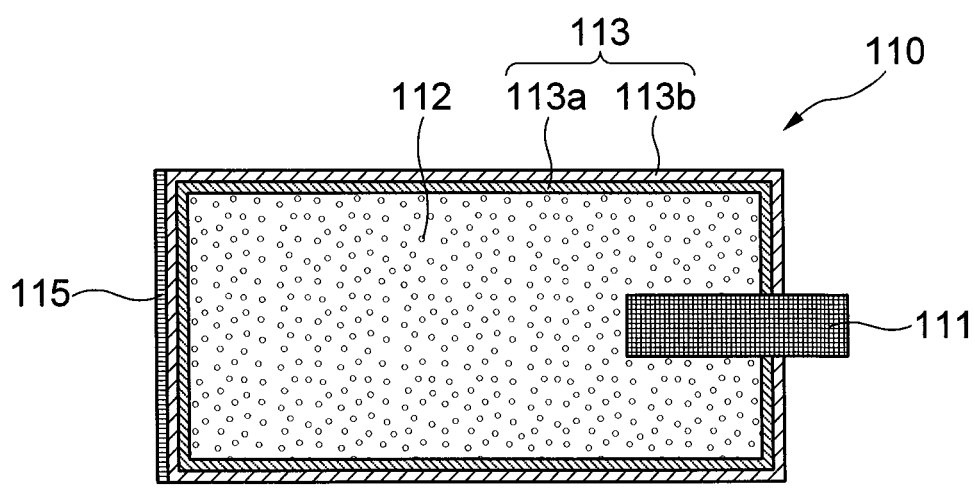
FIG. 4 is a cross-sectional view showing a condenser element employed in the present invention.

First, FIG. 3 is cross-sectional view showing a solid electrolytic condenser in accordance with an embodiment of the present invention. FIG. 4 is a cross-sectional view showing a condenser element employed in the present invention.

As shown in the drawings, the solid electrolytic condenser 100 in accordance with an embodiment of the present invention includes a condenser element 110 coupled to an anode wire 111 formed on an one-side end portion thereof, a cathode drawing layer 120 formed on the other-side end surface of the condenser element 110, terminal reinforcements 150 adhered to both-side portions of a bottom surface of the condenser element 110, a molding part 130 surrounding an outer circumferential surface of the condenser element 110, and an anode terminal 141 and a cathode terminal 142 formed on both-side surfaces of the molding part 130.

In this case, a bottom surface of the condenser element 110 between the anode terminal 141 and the cathode terminal 142 is filled with a liquid epoxy resin (EMC) 160. The liquid epoxy resin 160 is interposed between a surface at which the condenser element 110 and the terminal reinforcements 150 are in contact with each another so that the condenser element 110 and the terminal reinforcements 150 stick to one another.

A detailed description will be given of each component of the solid electrolytic condenser 100 in accordance with an embodiment of the present invention. The condenser element 110 is formed to be in the rectangular parallelepiped shape having one end portion of the anode wire 111, which is electrically connected to the anode terminal 141 in such a manner to be exposed to the one-side end portion of the condenser element 110.

The condenser element 110 has an anode polarity, as shown in FIG. 4, and it includes a tantalum pellet 112 having a cathode layer (not shown) formed on an external surface thereof, and a cathode reinforcement layer 113 formed by sequential coating of a carbon 113a and silver paste 113b on an outside of the cathode layer.

The tantalum pellet 112 is insulated from the cathode layer formed on the outer side thereof by an insulating layer composed of a dielectric oxidized film. The insulating layer is formed by growing an oxidized film (Ta2O5) on a surface of the tantalum pellet 112 by the formation process employing electro-chemical reactions.

In this case, the insulating layer transforms the tantalum pellet 112 into dielectric.

Herein, as the tantalum pellet 112 is manufactured with a mixture of tantalum powder and a binder, the tantalum powder and the binder are mixed and agitated at a predetermined ratio, the mixed powder is compressed to be molded in the rectangular parallelepiped shape, and then the resulting powder is sintered under high vibration and high temperature.

The tantalum pellet 112 may be manufactured in a sintering scheme by using a material like Nibio (Nb) oxide, in addition to tantalum (Ta).

The cathode layer allows a manganese dioxide layer ($MnO_2$), which has a cathode by impregnating the tantalum pellet 112 formed into the insulating layer with manganese nitrate solution so that manganese oxide solution is coated on the external surface thereof, and then sintering the resulting tantalum pellet.

The illustration and indication of reference numerals are omitted in the drawing because the above components are regarded as the well-known techniques which can be sufficiently appreciated by those skilled in the art at the time of manufacturing the solid electrolytic condenser employed in the present invention.

Meanwhile, as the cathode reinforcement layer 113 on which the carbon 113a and the silver paste 113b are sequentially coated is formed on the outer-side surface of the cathode layer, the cathode reinforcement layer 113 improves the conductivity for a polarity having the cathode layer, resulting in easy electrical connection for transferring polarity to the cathode drawing layer 120 coupled to the cathode reinforcement layer 113.

The anode wire 111 is coupled to one end portion of the condenser element 110, and the cathode drawing layer 120 is formed on the other end portion of the condenser element 110 having the cathode reinforcement layer 113 formed on the external surface thereof, that is, an end portion opposite to the one end coupled to the anode wire 111, so that the cathode terminal in the state of being bonded to the cathode drawing layer 120 can be stably drawn.

It is preferable that the cathode drawing layer 120 is composed of a viscous conductive paste, such as Au, Pd, Ag, Ni, Cu, and so on. The conducive paste is coated on one surface of the condenser element 110, so as to provide enough strength and hardness through a processing, such as drying, curing, and firing.

In this case, the cathode drawing layer 120 is cured between about 30 to 300° C.

Also, the cathode drawing layer 120 may be formed in various types, including a dispensing type in which the anode wire 111 is coupled to one surface of the condenser element 110, a dipping type in which a predetermined amount of a paste is allowed to be adhered to one surface of the condenser element 110, and a printing type in which a paste is allowed to be printed on the sheet such that the paste is adhered to one surface of the condenser element 110.

Meanwhile, a conductive buffering material 115 is interposed between the cathode reinforcement layer 113 and the cathode drawing layer 120 of one surface of the condenser element 110. Herein, the conductive buffering material 115 plays a role of protecting a surface of the condenser element 110 having the cathode drawing layer 120 formed thereon from an external environment.

It is preferable that the conductive buffering material 115 is formed with epoxy-based material having superior chemical-mechanical affinity so that the cathode drawing layer 120 of the viscous conductive paste can be easily bonded to the silver paste 113b constituting the outermost layer of the cathode reinforcement layer 113.

In this case, interposing of the conductive buffering material 115 between the cathode reinforcement layer 113 and the cathode drawing layer 120 aims to solve contact trouble which may occur due to direct contact of the conductive paste of the cathode drawing layer 120 and silver paste 113b of being the outermost layer of the cathode reinforcement layer 113.

The conductive buffering material 115 may be formed with the lead frame composed of not only a conductive epoxy-based material, but also a steel material or a paste material.

Meanwhile, the terminal reinforcements 150 with a predetermined thickness are adhered to both-side portions of the bottom surface of the condenser element 110.

The terminal reinforcements 150 are adhered to the bottom surface of the condenser element 110 on portions where the cathode terminal 142 and the anode terminal 141 formed at the out-side surface of the molding part 130 are formed. The terminal reinforcement 150 is closely coupled to the condenser element 110 through the liquid epoxy resin 160 (i.e. liquid EMC) interposed between a surface bonded to the condenser element 110.

The condenser element 110 is frequently mounted on an examination equipment so as to perform voltage applying and characteristic examination in a process for manufacturing a solid electrolytic condenser in accordance with an embodiment of the present invention. In this case, when a probe of the examination equipment comes into contact with the anode terminal 141 and the cathode terminal 142, the impact buffering is achieved by the terminal reinforcements 150 adhered to portions at which terminals are formed, so that delamination or damage of a terminal can be prevented.

The terminal reinforcement 150 may be composed of a metal material, a synthetic resin material, or a ceramic material, which are above predetermined strength. As for the metal material, steel or a conductive material like Cu, Ni may be exemplified.

Also, the thickness of the terminal reinforcement 150 may be within a range of 100 µm. Preferably, the terminal reinforcement 150 may be formed to have a thickness from 20 to 50 µm within a space where the condenser element 110 coupled to the terminal reinforcement 150 is limited, so as to optimally provide volume efficiency.

When the terminal reinforcements 150 are adhered to the bottom surface of the condenser element 110, intermediary for adhering them each other is composed of the liquid epoxy resin 160 filled between the terminal reinforcements 150.

The liquid epoxy resin 160 plays a role of covering the bottom surface of the condenser element 110 and of protecting the condenser element 110 simultaneously. Further, the liquid epoxy resin 160 is interposed between the bonding surface between the condenser element 110 and the terminal reinforcements 150 so that the terminal reinforcements 150 can firmly stick to the bottom surface of the condenser element 110.

In this case, as the liquid epoxy resin 160 is composed of an insulating material, the terminal reinforcements 150 of the conductive material adhered to portions where the condenser element 110 and the cathode terminal 142 are formed are insulted for short prevention.

Also, in general, a predetermined amount of a release agent is contained in the liquid epoxy resin 160. In the case where the liquid epoxy resin 160 applied to the embodiment of the present invention contains a release agent, bonding strength between the condenser element 110 and the terminal reinforcement 150 may be weakened. Due to this, the liquid epoxy resin 160 containing no release agent is used, which makes it possible to improve the bonding strength between the condenser element 110 and the terminal reinforcement 150.

Herein, the reason why the outside of the condenser element 110 is covered by filling the bottom surface of the condenser element 110 with the liquid epoxy resin 160, aside from the molding part 130 surrounding the top portion of the condenser element 110, is that when the bottom surface of the condenser element 110 is molded with an epoxy material constituting the molding part 130, molding failure may occur due to non-filling of the epoxy material. That is, this aims to solve incomplete-molding failure by using the liquid epoxy resin 160 having relatively less filler contained in the epoxy resin.

In other words, the molding part 130 forming an armoring of the condenser element 110 is composed of an epoxy resin in such a manner that the filler with a size of 50 to 100 µm has a content of 60 to 90%. When the epoxy resin is coated on the bottom surface of the condenser element 110 during formation of the molding part 130 through such an epoxy resin, the epoxy resin fails to be completely filled by the size of the filler formed on the bottom surface of the condenser element 110.

Therefore, the bottom surface of the condenser element 110 is filled with a liquid epoxy resin having a content of 50 to 90% containing fillers of 20~30 µm, so that it is possible to prevent filling-failure of the resin due to the size of the fillers.

The liquid epoxy resin 160 is coated and cured on the bottom surface of the condenser element 110, and then the molding part 130 is formed to surround the outer circumferential surface except for the bottom surface of the condenser element 110.

When the molding part 130 is entirely formed on the outer circumferential surface of the condenser element 110, the molding part 130 surrounds portions, excluding an end portion of the anode wire 111 and an end surface of the cathode drawing layer 120 which are exposed to both sides of the condenser element 110, and the bottom surface of the condenser element 110, so that the condenser element 110 can be protected from the external environment. In this case, the molding part 130 is mostly composed of an epoxy material.

As for a method of forming the molding part 130 on the outer circumferential surface of the condenser element 110, a method for forming the molding part 130 by using an epoxy for each condenser element 110, and a method for collectively forming the molding part 130 after arranging the condenser element 110 with equal spacing are exemplified.

As such, the molding part 130 surrounding the condenser element 110 is provided with the anode terminal 141 and the cathode terminal 142 on both-side surfaces by a plating layer, so that individual solid electrolytic condenser 100 is manufactured.

In this case, although the anode terminal 141 and the cathode terminal 142 are formed only on the both-side surfaces of the molding part 130, it is preferable that the terminals extend from the both-side surfaces to the bottom portion of the molding part 130, seeing that the solid electrolytic condenser mostly corresponds to a surface-mounted electronic component.

That is, as shown in FIG. 3, the cathode drawing layer 120 and the anode wire 111 exposed from the both-side surfaces of the molding part 130 to an outside come into electrical contact with the plating layer, and thus the anode terminal 141 and the cathode terminal 142 are formed. In this case, the anode terminal 141 and the cathode terminal 142 are extended to the bottom surface of a pair of terminal reinforcement 150 adhered to the both-side portions of the bottom surface of the condenser element 110.

Herein, as the liquid epoxy resin 160 coated on the bottom surface of the condenser element 110 is partially introduced to the top surface of the terminal reinforcement 150, the introduced liquid epoxy resin maintains a state where the reinforcing member 150 of an anode terminal side is insulated from the condenser element 110.

Also, the plating layer for formation of the anode terminal 141 and the cathode terminal 142 may be formed by electro plating, or electroless plating, and the plating layer may be formed by dipping, or paste plating, so as to reduce manufacturing costs of the solid electrolytic condenser.

In the case where the plating layer is formed by electroless plating, preferably, the plating layer is composed of an internal plating layer formed through electroless Ni/P plating, and an external plating layer formed on the internal plating layer through Cu plating, or Sn plating.

Meanwhile, a detailed description will be given of a method for manufacturing a solid electrolytic condenser having the same above-described technical construction, with reference to the above-described drawings and additionally-shown drawings below.

Figure 5:
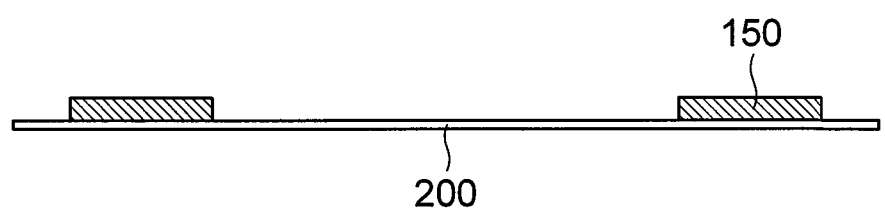
FIG. 5 is a cross-sectional view showing formation of the terminal reinforcement.
Figure 6:
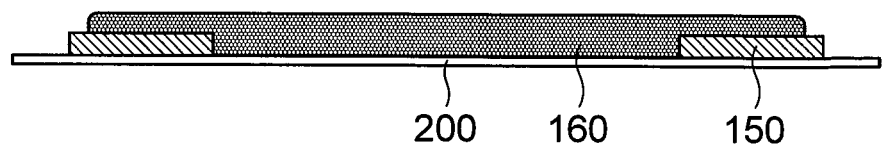
FIG. 6 is a cross-sectional view showing a process for plating the liquid epoxy resin.
Figure 7:
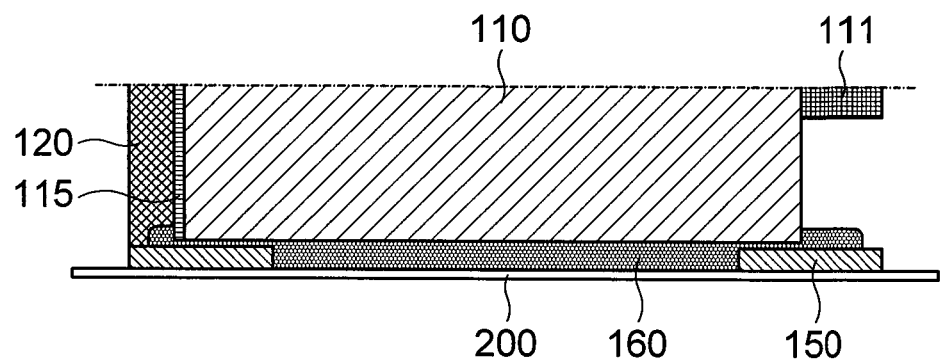
FIG. 7 is a cross-sectional view showing a process for mounting the condenser element into the terminal reinforcement.
Figure 8:
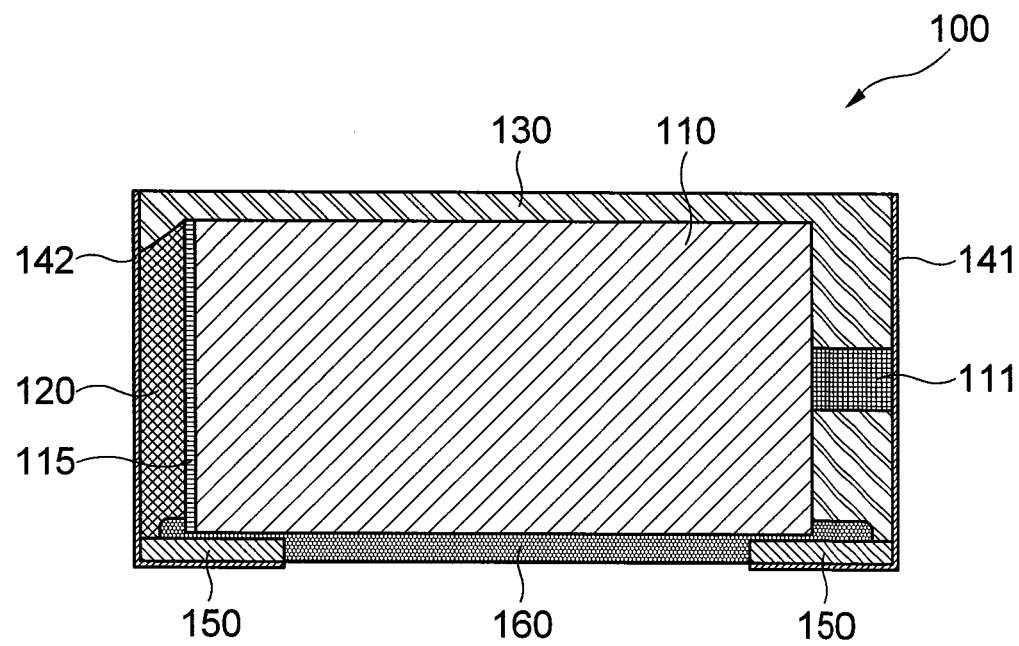
FIG. 8 is a cross-sectional view showing a process for forming the molding part on the outside of the condenser element.

FIGS. 5 to 8 are views showing processes for manufacturing the solid electrolytic condenser in accordance with an embodiment of the present invention. FIG. 5 is a cross-sectional view showing formation of the terminal reinforcement, and FIG. 6 is a cross-sectional view showing a process for plating the liquid epoxy resin. FIG. 7 is a cross-sectional view showing a process for mounting the condenser element into the terminal reinforcement, and FIG. 8 is a cross-sectional view showing a process for forming the molding part on the outside of the condenser element.

First, as shown in FIG. 5, the terminal reinforcements 150 are formed on a sheet 200 of a synthetic resin material at predetermined spacing, respectively, and the liquid epoxy resin 160 is coated on the top surface of the sheet 200 so that the terminal reinforcements 150 are partially covered.

In this case, spacing at which the terminal reinforcements 150 are arranged may vary depending on the size of the condenser element 110, and spacing is required to be formed such that it is possible to stably support the bottom surface of the both-side portions of the condenser element 110 seated on the terminal reinforcements 150

Also, preferably, when the liquid epoxy resin 160 is coated on the sheet 200, the liquid epoxy resin 160 is partially mounted on the top surfaces of the terminal reinforcements 150 in such a manner to be covered. The liquid epoxy resin 160 coated on the terminal reinforcements 150 is cured, which makes it possible to firmly stick the condenser element 110 seated on the top surface thereof to the terminal reinforcements 150.

Thereafter, the condenser element is prepared that includes the anode wire 111 and the cathode drawing layer 120, and has a surface of cathode property by the cathode reinforcement layer 113 for surrounding the outside. Herein, one end portion of the anode wire is coupled to be protruded to one-side surface of the condenser element, and the cathode drawing layer is formed on the other-side surface of the condenser element.

The cathode drawing layer 120 formed on the condenser element 110 may be formed by either a dispensing type using a nozzle, or a dipping type, and a printing type. In this case, the method for forming the cathode drawing layer 120 is not limited thereto and can be applied various scheme for stably drawing a cathode from the cathode reinforcement layer 113.

Preferably, the cathode drawing layer 120 may be formed of a viscous conductive paste, such as Au, Pd, Ag, Ni, Cu, and so on. The cathode drawing layer 120 is coated on one surface of the condenser element 110, so that it has enough strength and hardness through drying, curing, firing, and so on at a temperature between about 30 to 300° C.

Herein, the conductive buffering material 115 may be further formed on one end surface of the condenser element 110, before the cathode drawing layer 120 is formed on one surface of the condenser element 110. The conductive buffering material 115 plays a role of protecting a surface of one end of the condenser element 110 from an external environment while preventing contact trouble of two members occurring at a contact interfere between the cathode drawing layer 120 and the cathode reinforcement layer 113 formed on the condenser element 110.

Thereafter, the condenser element 110 having the anode wire 111 and the cathode drawing layer 120 formed thereon is mounted on the sheet 200 on which the liquid epoxy resin 160 is coated to reach the top portions of the terminal reinforcements 150.

In this case, the both-side bottom surface of the condenser element 110 is seated on the top surface of the terminal reinforcements 150, and the terminal reinforcements 150 firmly stick to the condenser element 110 by the liquid epoxy resin 160 interposed between the terminal reinforcements 150 and the bottom surface of the condenser element 110. In this case, the bottom surface of the condenser element 110 is allowed to be protected by the liquid epoxy resin 160 coated on the sheet 200.

As such, the molding part 130 is formed on an external surface of the condenser element 110 except for a portion covered with the liquid epoxy resin 160 by using an epoxy resin containing a filler of relatively large particles, as shown in FIG. 8.

After being seated on the sheet 200, the molding part 130 is subjected to a molding processing in such a manner to cover the outer circumferential surface of the condenser element 110 arranged with equal spacing, and the outer circumferential surfaces of the anode wire 111 and the cathode drawing layer 120 exposed from the condenser element 110.

Thereafter, the condenser element 110 having the molding part 130 formed thereon is individually cut, and thus the cut condenser element is formed.

The solid electrolytic condenser 100 having the molding part 130 formed thereon may be cut, through a dicing scheme using a blade, or a laser cutting scheme using a laser, based on the condenser element 110. The unit condenser cut as a discrete product undergoes grinding or trimming of its cut surface in such a manner that an end portion of the anode wire 111 and an end surface of the cathode drawing layer 120 are exposed.

Thereafter, the sheet 200 made so as to the terminal reinforcements 150 and coat the liquid epoxy resin 160 is removed. The removal of the sheet 200 may be achieved through a chemical method or a mechanical method.

Impurities of a surface where the plating layer is to be formed are removed by grinding and trimming of the both-side surface of the condenser element 110. The discrete product having been subjected to the grinding and trimming undergoes plating of the both-side surface of the molding part 130 and the bottom surface of respective terminal reinforcements 150, thereby forming the anode terminal 141 and the cathode terminal 142.

In this case, the anode wire 111 whose end surface is exposed on the molding part 130 uses a laser for removal of a phosphating film of the surface, thereby improving electrical conductivity.

The formation of the plating layer for forming the anode terminal 141 and the cathode terminal 142 may be achieved through electro plating or electroless plating, as similar to the above-description. The plating layer may be formed on the both-side surface of the molding part 130 through a plating scheme and a dipping scheme using a paste.

Meanwhile, embodiments for each of the processes for forming the terminal reinforcement will be briefly described with reference to FIGS. 9 and 10.

Figure 9:
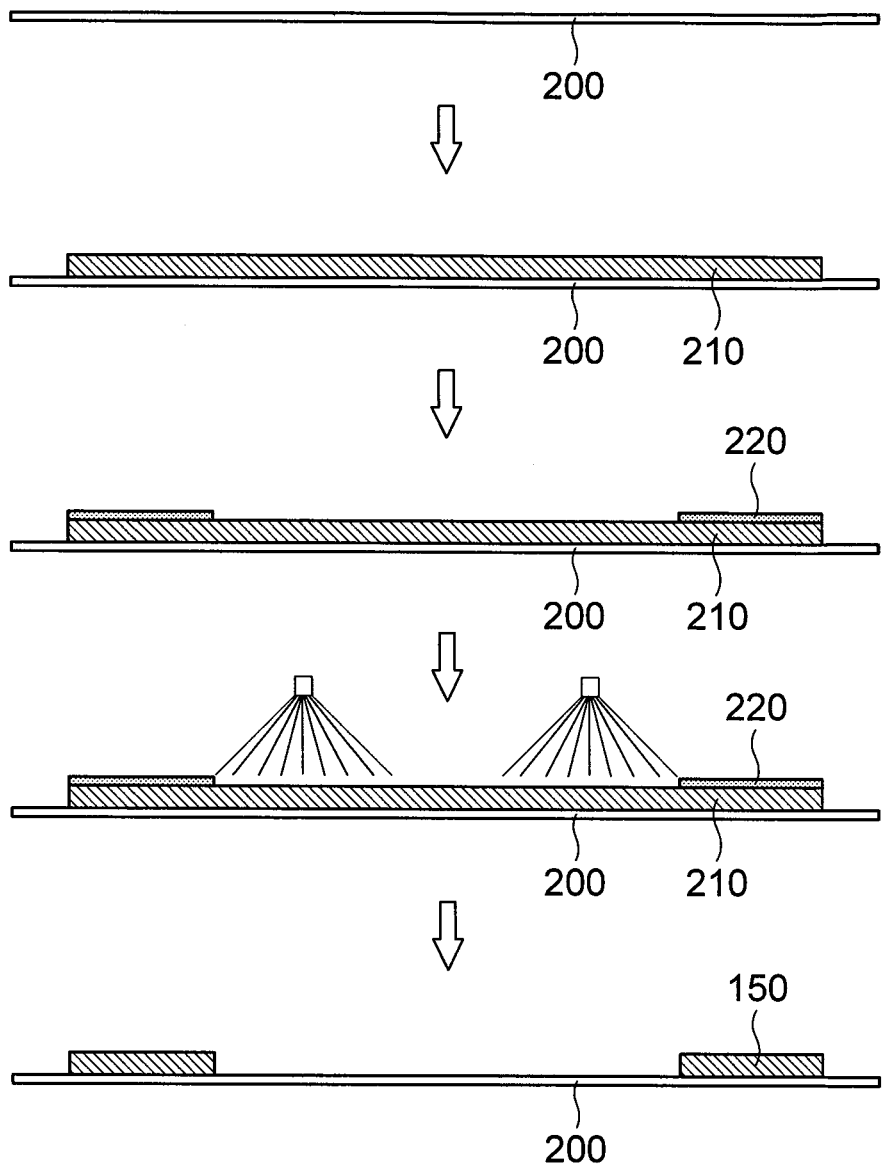
FIG. 9 is a view showing a process for forming the terminal reinforcement of the present invention, by etching.

FIG. 9 is a view showing a process for forming the terminal reinforcements 150 of the present invention by etching. FIG. 10 is a view showing a process for forming the terminal reinforcement 150 of the present invention by plating.

As shown in FIG. 9, in order to form the terminal reinforcements, a conductive foil 210, such as Cu, or Ni is adhered on the sheet 200 composed of a synthetic resin film at a thickness of about 150 μm or lower.

Then, a film-type mask pattern 220 is adhered on the top surface of the conductive foil 210 coated on the sheet at a uniform thickness, that is, locations where the terminal reinforcements 150 are to be formed, and the conductive foil 210 is subjected to an etching processing so that patterning can be achieved.

After the patterning, the mask pattern 220 on the top surface of the conductive foil 210 is removed, and then the sheet 200 having a pair of the terminal reinforcements 150 provided thereon is completely manufactured.

Figure 10:
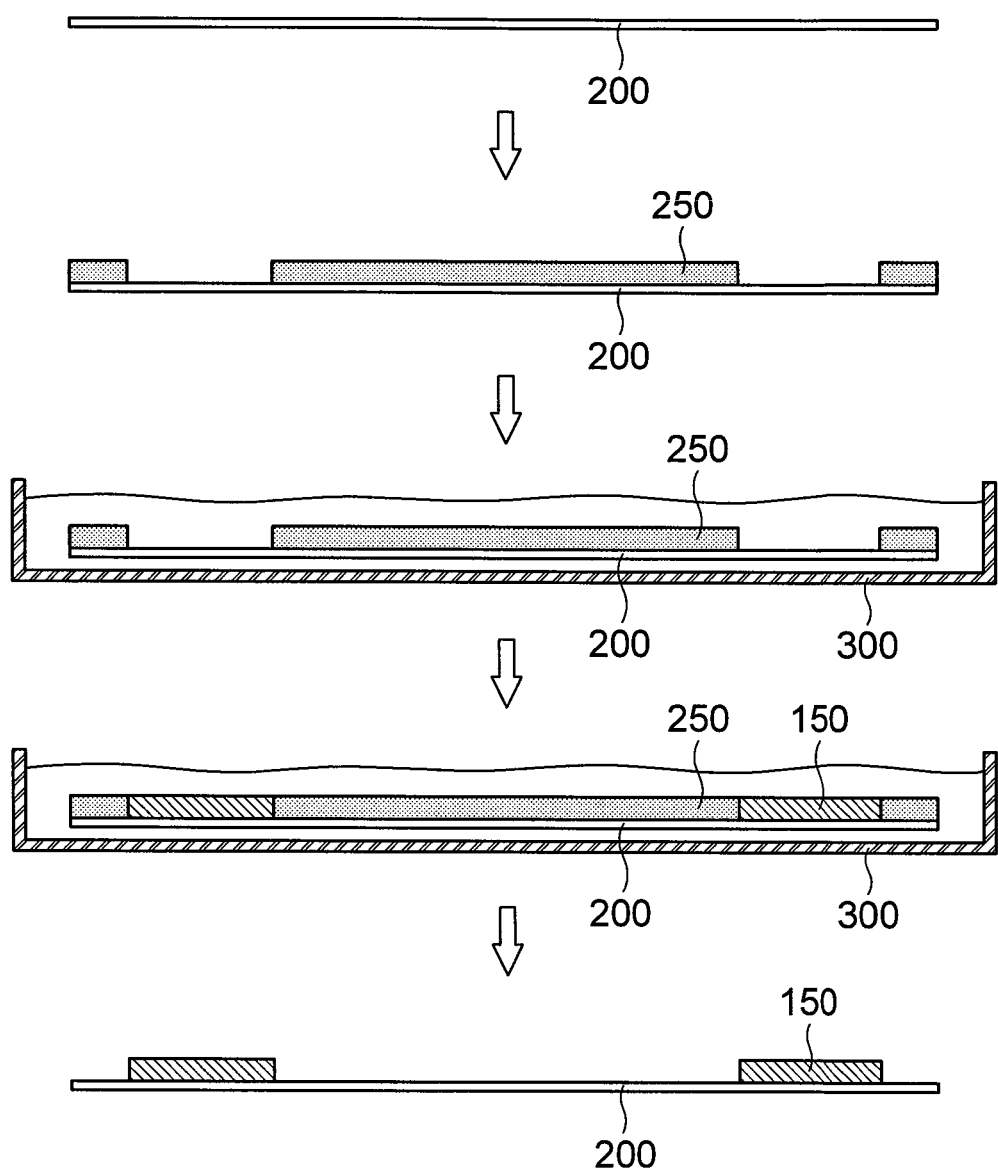
FIG. 10 is a view showing a process for forming the terminal reinforcement of the present invention, by plating.

Also, as shown in FIG. 10, a film is adhered on the sheet 200 composed of a synthetic resin film at a thickness identical to the plating thickness, thereby forming the pattern 250 on the plated portion.

Then, the film 200 having the pattern 250 formed thereon is immersed in a plating bath 300 for electro plating or electroless plating, thereby growing the plating layer composed of Cu, or Ni on the pattern.

After completing plating of a portion where the pattern is formed, adhesion film of the remaining part is removed, and then the sheet 200 having a pair of the terminal reinforcements 150 provided thereon is completely manufactured.

In this case, preferably, the sheet 200 is configured to be resistant to thermal deformation and chemicals in the film type where post-processing like cutting can be easily performed. The present invention is not limited thereto, and it is possible to use a material such as a polyimide film, or a thin steel, which corresponds to a material whose thickness is 150 μm or lower and whose deformation can be minimized at about 260° C.

Figure 11:
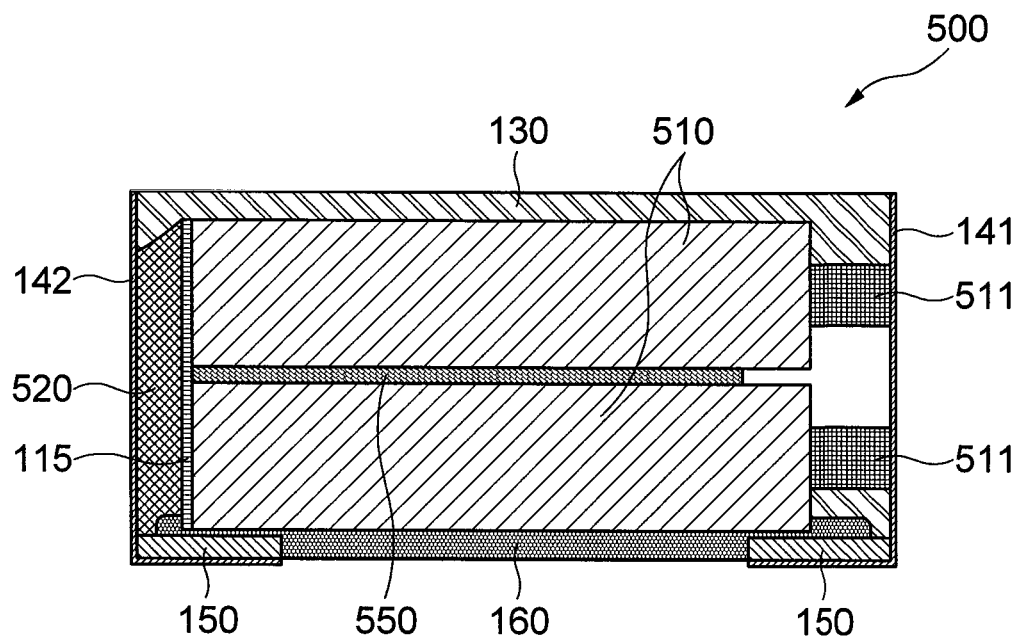
FIG. 11 and FIGS. 12A-12B are a cross-sectional view showing a solid electrolytic condenser in accordance with another embodiment of the present invention.

Meanwhile, FIGS. 11 and 12 are cross-sectional views showing a solid electrolytic condenser 100 in accordance with other embodiment of the present invention.

Those components that are the same or are in correspondence are rendered the same reference numeral regardless of the figure number, and redundant explanations are omitted.

As shown in drawings, the solid electrolytic condenser 500 of the embodiment of the present invention is provided with the condenser elements 510, which are coupled to the terminal reinforcements 150 and are arranged to be parallel to each other. In the solid electrolytic condenser 500, it is possible to increase condenser element' capacity by improving an impregnation property of the condenser element, and to implement low ESR (Equivalent Series Resistance) characteristics.

In this case, the condenser element 510 arranged in parallel on the terminal reinforcements 150 can come into close contact with each other by the conductive adhesive 550.

Figure 12A:
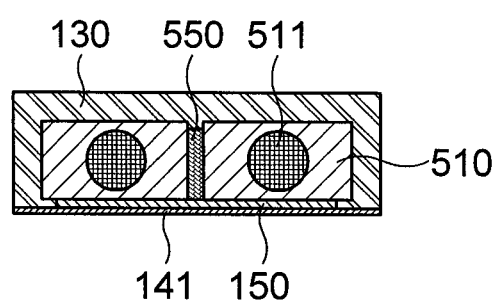
Figure 12B:
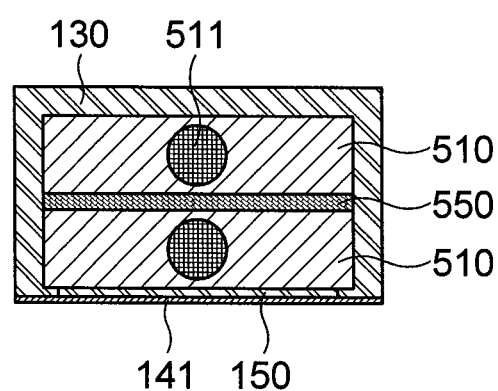

Also, in the present embodiment, as shown in FIG. 12, the condenser element 510 coupled to the anode wire 511 may be configured to be parallel in a vertical direction (referring to FIG. 12A) or to be parallel in a horizontal direction (referring to FIG. 12B). In connecting a plurality of condenser elements 510 having a relatively thin thickness to be in parallel to one another, a surface area of the condenser element 510 is expanded per unit volume, thereby enlarging capacitance of a condenser.

That is, in the case where a single condenser element similar to an embodiment shown in FIG. 3 is used, the size of pellet constituting a condenser element becomes higher, so it is difficult to infiltrate an impregnation solution to reach a central portion of the pellet. In contrary thereto, the thinner the thickness of the pellet, the easier the impregnation solution is infiltrated to reach the central portion of the pellet. Therefore, as the pellet is kept to have a thin thickness, it is easy to maintain the low ESR characteristics by improvement of the impregnation property.

Therefore, as shown in FIG. 12, a plurality of condenser elements 510 formed at a relatively thin thickness are arranged to be parallel to one another, and an anode terminal 141 is formed in such a manner to be connected to the anode wire 511 which is coupled to be protruded at one-side portion of respective condenser elements 510, and a cathode terminal 142 connected to the cathode drawing layer 520 formed at the other-side portion of respective condenser elements 510 is formed.

As described above, according to a solid electrolytic condenser and a method for manufacturing the same in accordance with an embodiment of the present invention, the structure and process of the solid electrolytic condenser is simplified, so that manufacturing costs can be reduced. Further, a buffering operation by the terminal reinforcements can improve mechanical reliability of portions where terminals are formed.

According to the solid electrolytic condenser and a method for manufacturing the same in accordance with an embodiment of the present invention, it is possible to downsize the solid electrolytic condenser, and maximize capacitance.

According to the solid electrolytic condenser and a method for manufacturing the same in accordance with an embodiment of the present invention, it is possible to implement low ESR of the solid electrolytic condenser.

As described above, although the preferable embodiments of the present invention have been shown and described, it will be appreciated by those skilled in the art that substitutions, modifications and variations may be made in these embodiments without departing from the principles and spirit of the general inventive concept, the scope of which is defined in the appended claims and their equivalents.

What is claimed is:

1. A solid electrolytic condenser, comprising:
    a condenser element including an inner side that has an anode polarity;
    an anode wire including one end portion that is inserted into the condenser element;
    a cathode drawing layer formed on an outer side of the condenser element;
    terminal reinforcements arranged respectively under opposite side portions of a bottom surface of the condenser element;
    a liquid epoxy resin (EMC) filled in (a) a space between the terminal reinforcements and (b) spaces between the bottom surface of the condenser element and top surfaces of the terminal reinforcements;
    a molding part surrounding the condenser element while exposing a protruded end portion of the anode wire, an end portion of the cathode drawing layer, and bottom surfaces of the terminal reinforcements; and
    anode and cathode terminals formed by a plating layer provided on the bottom surfaces of the terminal reinforcements and on opposite side surfaces of the molding part, wherein
    the liquid epoxy resin includes fillers of a smaller size than those in the molding part.

2. The solid electrolytic condenser of claim 1, further comprising:
    a conductive buffering material that is interposed between the condenser element and the cathode drawing layer.

3. The solid electrolytic condenser of claim 1, wherein the terminal reinforcements include a metal material or a synthetic resin material.

4. The solid electrolytic condenser of claim 3, wherein the terminal reinforcements include steel or a metal selected from the group consisting of Cu and Ni.

5. The solid electrolytic condenser of claim 3, wherein a thickness of the terminal reinforcements is 20 μm to 50 μm.

6. The solid electrolytic condenser of claim 1, wherein the liquid epoxy resin contacts at least two surfaces other than the exposed bottom surface of each of the terminal reinforcements with one another, thereby improving bonding strength of the terminal reinforcement.

7. The solid electrolytic condenser of claim 1, further comprising:
    a conductive buffering material that is interposed between the condenser element and the cathode drawing layer, wherein the conductive buffering material is a lead frame including steel or a paste material.

8. The solid electrolytic condenser of claim 1, wherein the cathode drawing layer is formed in a dispensing type, a dipping type, or a printing type.

9. The solid electrolytic condenser of claim 8, wherein the cathode drawing layer is formed in a viscous paste type in which a conductive material is contained.

10. The solid electrolytic condenser of claim 8, wherein the cathode drawing layer is formed of a viscous conductive paste including one selected from the group consisting of Au, Pd, Ag, Ni, and Cu.

11. The solid electrolytic condenser of claim 1, wherein the anode terminal and the cathode terminal are formed by any one selected from the group consisting of electro plating, electroless plating, dipping, and paste coating.

12. The solid electrolytic condenser of claim 11, wherein, when the anode terminal and the cathode terminal are formed through electroless plating, the plating layer includes:
    an internal plating layer formed through electroless Ni/P plating, and
    an external plating layer formed on the internal plating layer through Cu plating, or Sn plating.

13. The solid electrolytic condenser of claim 1, wherein the anode terminal and the cathode terminal formed by the plating layer extend from the opposite side surfaces of the molding part to the bottom surfaces of the terminal reinforcements adjacent thereto.

14. The solid electrolytic condenser of claim 1, wherein a plurality of condenser elements are arranged to be parallel to one another on the terminal reinforcements on which the liquid epoxy resin is coated.

15. The solid electrolytic condenser of claim 14, wherein the condenser elements are arranged in parallel in a vertical direction or a horizontal direction.

16. The solid electrolytic condenser of claim 1, wherein
    the size of the fillers in the liquid epoxy resin is 20 μm to 30 μm, and
    the size of the fillers in the molding part is 50 μm to 100 μm.

* * * * *